(12) United States Patent
Moran et al.

(10) Patent No.: US 9,512,804 B2
(45) Date of Patent: Dec. 6, 2016

(54) COMPACT PACKAGING FOR INTAKE CHARGE AIR COOLING

(71) Applicant: GM Global Technology Operations LLC, Detroit, MI (US)

(72) Inventors: Robert J. Moran, Ann Arbor, MI (US); Alan E. Bowler, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 48 days.

(21) Appl. No.: 14/156,943

(22) Filed: Jan. 16, 2014

(65) Prior Publication Data

US 2015/0198111 A1    Jul. 16, 2015

(51) Int. Cl.
| | |
|---|---|
| F01P 9/04 | (2006.01) |
| F02F 1/36 | (2006.01) |
| F02F 1/42 | (2006.01) |
| F02F 1/24 | (2006.01) |
| F02B 29/04 | (2006.01) |
| F02M 35/10 | (2006.01) |

(52) U.S. Cl.
CPC ............ *F02F 1/42* (2013.01); *F02B 29/0462* (2013.01); *F02B 29/0475* (2013.01); *F02F 1/243* (2013.01); *F02M 35/10052* (2013.01); *Y02T 10/146* (2013.01); *Y02T 10/148* (2013.01)

(58) Field of Classification Search
CPC ... F02B 29/0475; F02B 29/0418; F02B 29/04; F01P 3/00
USPC ......... 123/41.01, 41.57, 41.82 R, 559.1, 563
See application file for complete search history.

(56) References Cited

U.S. PATENT DOCUMENTS

| | | | | |
|---|---|---|---|---|
| 2,745,392 A | * | 5/1956 | Nallinger | 123/559.1 |
| 2,804,284 A | * | 8/1957 | Otten | 165/166 |
| 3,881,455 A | * | 5/1975 | Belsanti | 123/563 |
| 3,889,644 A | * | 6/1975 | Moore | 123/41.77 |
| 3,949,715 A | * | 4/1976 | Faix | F01N 3/34 123/184.42 |
| 4,069,796 A | * | 1/1978 | Balsley | F02F 7/006 123/184.41 |
| 4,258,687 A | * | 3/1981 | Mauch | F01P 3/18 123/184.33 |
| 4,269,158 A | * | 5/1981 | Berti | 123/563 |
| 4,508,684 A | * | 4/1985 | Huff et al. | 422/8 |
| 4,660,532 A | * | 4/1987 | Tholen | F02B 29/0431 123/563 |
| 5,197,532 A | * | 3/1993 | Cagle | 164/137 |

(Continued)

FOREIGN PATENT DOCUMENTS

| | | |
|---|---|---|
| DE | 699 19 583 T2 | 9/2005 |
| DE | 10 2012 002 463 A1 | 8/2013 |
| DE | 11 2012 001 057 T5 | 11/2013 |

*Primary Examiner* — John Kwon
*Assistant Examiner* — Tea Holbrook
(74) *Attorney, Agent, or Firm* — Harness, Dickey & Pierce, P.L.C.

(57) ABSTRACT

An internal combustion engine includes an engine block defining a plurality of cylinders. A cylinder head casting is mounted to the engine block. The cylinder head casting defines intake ports and exhaust ports communicating with the plurality of cylinders. The cylinder head casting defines an air passage in connection with the intake ports and includes elongated extruded cooling elements defining liquid coolant passages integrated into the cylinder head casting within the air passage for cooling intake air passing through the air passage.

12 Claims, 4 Drawing Sheets

(56) References Cited

U.S. PATENT DOCUMENTS

| | | | | |
|---|---|---|---|---|
| 5,511,520 | A * | 4/1996 | Regueiro | 123/193.5 |
| 5,862,790 | A * | 1/1999 | Dai et al. | 123/316 |
| 6,604,514 | B1 * | 8/2003 | Englund et al. | 123/559.1 |
| 6,619,275 | B2 * | 9/2003 | Wiik | 123/559.1 |
| 7,137,384 | B1 * | 11/2006 | Kavadeles | 123/559.1 |
| 8,291,880 | B2 * | 10/2012 | Hafner et al. | 123/193.5 |
| 2009/0038574 | A1 * | 2/2009 | Schlicker | F02M 35/116 |
| | | | | 123/184.61 |
| 2009/0249774 | A1 * | 10/2009 | Sloss et al. | 60/323 |
| 2010/0258096 | A1 * | 10/2010 | Frank et al. | 123/563 |
| 2010/0263637 | A1 * | 10/2010 | Muller et al. | 123/556 |
| 2011/0088663 | A1 * | 4/2011 | Dehnen et al. | 123/542 |
| 2011/0173972 | A1 * | 7/2011 | Wade | F01N 13/10 |
| | | | | 60/602 |
| 2013/0180507 | A1 * | 7/2013 | Nakasugi et al. | 123/542 |
| 2013/0220289 | A1 * | 8/2013 | Maceroni et al. | 123/568.12 |
| 2013/0227932 | A1 * | 9/2013 | Maione et al. | 60/273 |
| 2013/0263797 | A1 * | 10/2013 | Sugiura et al. | 123/41.01 |
| 2013/0298884 | A1 * | 11/2013 | Odillard et al. | 123/568.17 |
| 2014/0245982 | A1 * | 9/2014 | Haefner et al. | 123/184.21 |

\* cited by examiner

COMPACT PACKAGING FOR INTAKE CHARGE AIR COOLING

FIELD

The present disclosure relates to internal combustion engines and more particularly intake charge air cooling for internal combustion engines.

BACKGROUND

This section provides background information related to the present disclosure which is not necessarily prior art.

Auto manufacturers continually strive to downsize engines to improve fuel economy and reduce $CO_2$ emissions. In order to minimize the reduction of engine output power due to the downsizing, turbochargers can be utilized to increase the power output of the engine. Turbochargers include a turbine that is driven by the exhaust gasses and include a compressor that is drivingly connected to the turbine for compressing the intake air supplied to the engine cylinders. The compressor generates charged or compressed air that typically requires cooling prior to introduction to the engine components. Therefore, there is a challenge to provide charge air cooling between the turbocharger compressor outlet and the intake manifold. To minimize the impact on the overall engine package size and mass, it is desirable to create a compact design for the charge air cooler that can achieve the performance targets.

SUMMARY

This section provides a general summary of the disclosure, and is not a comprehensive disclosure of its full scope or all of its features.

The present disclosure provides an internal combustion engine including an engine block defining a plurality of cylinders. A cylinder head is mounted to the engine block. The cylinder head defines intake ports and exhaust ports communicating with the plurality of cylinders. The cylinder head casting defines an air passage in connection with the intake ports and include cooling elements defining liquid coolant passages within the air passage for cooling intake air passing through the air passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
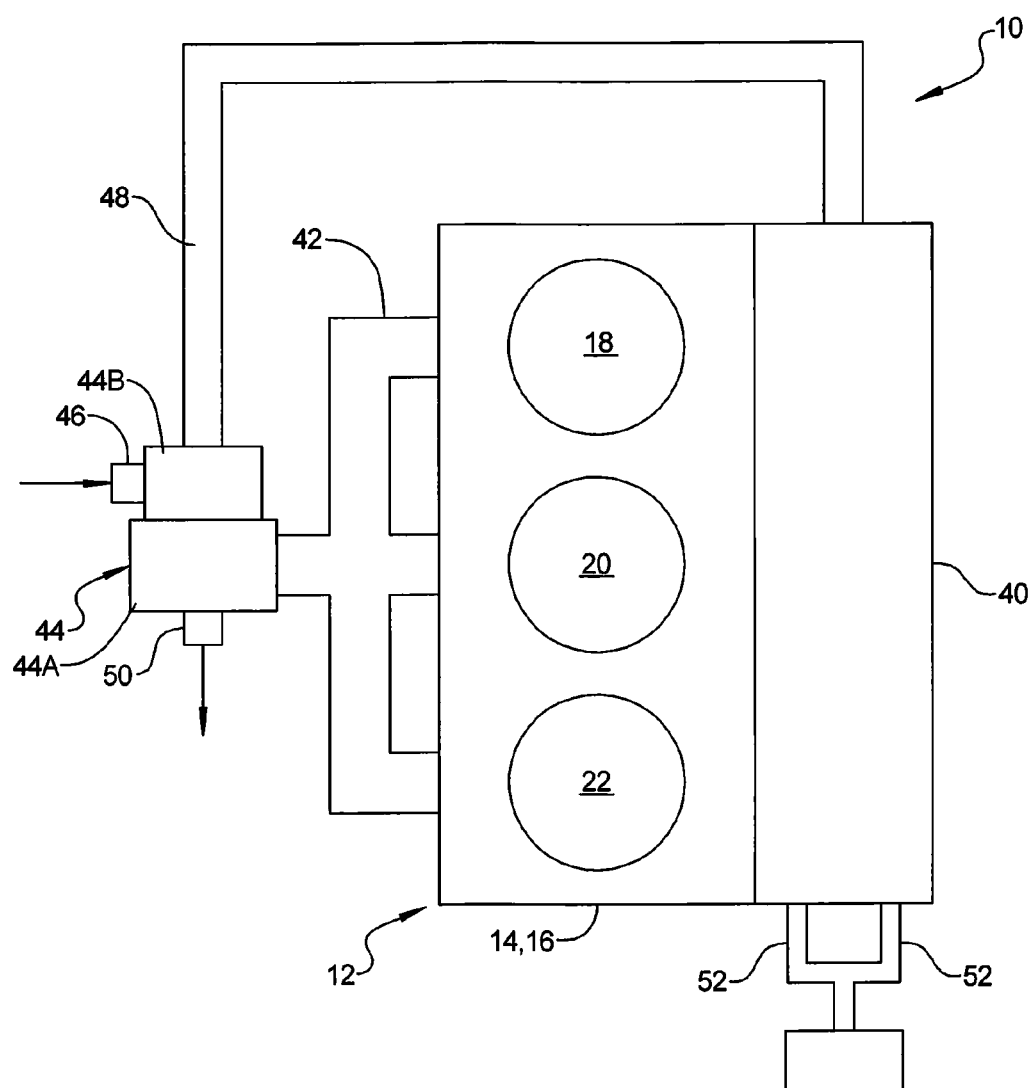
FIG. 1 is a schematic diagram of an internal combustion engine assembly having a charge air cooler integrated in the cylinder head.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 2:
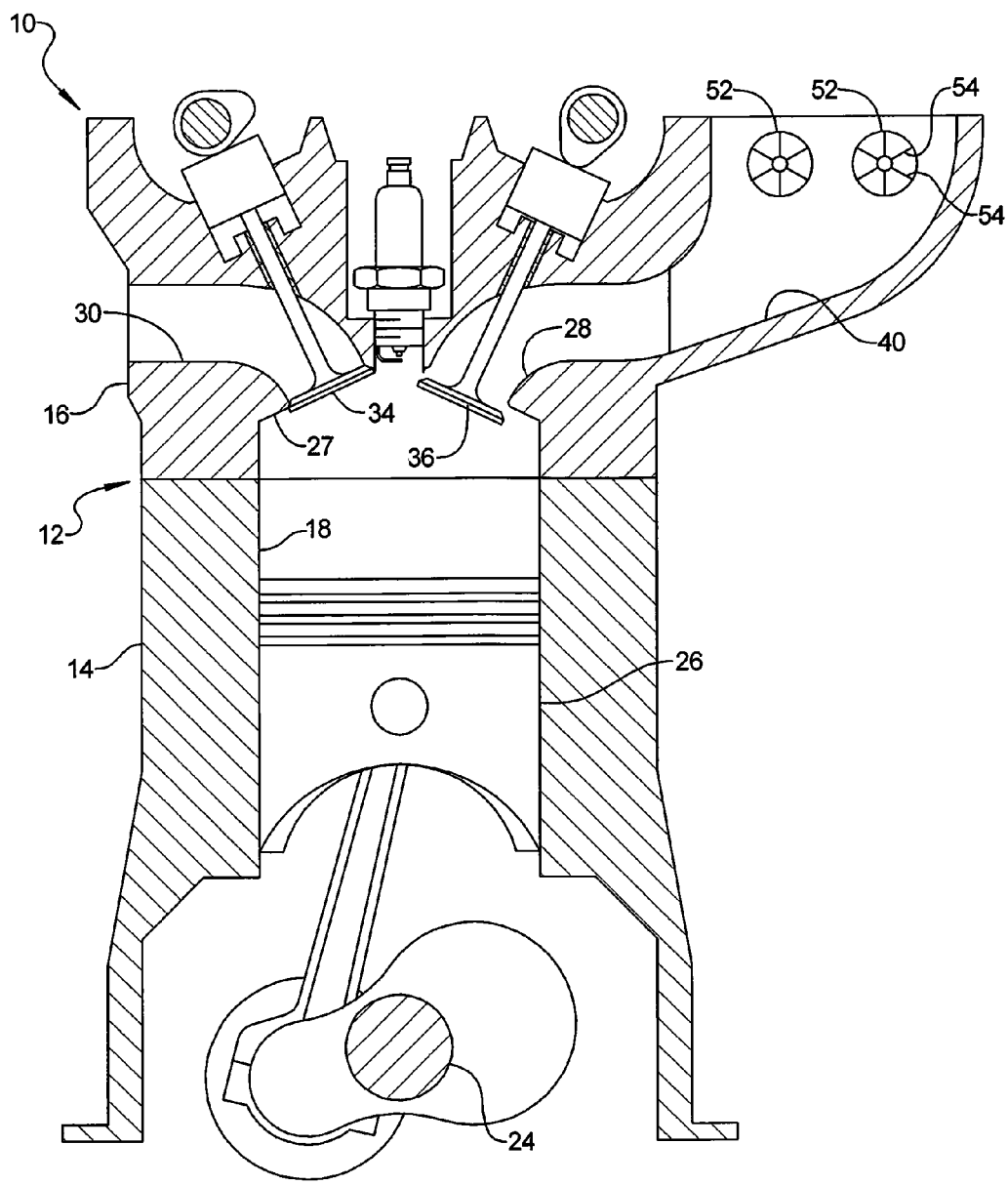
FIG. 2 is a cross-sectional view of the internal combustion engine of FIG. 1.

An engine assembly 10 is illustrated in FIGS. 1 and 2 and includes an engine structure 12. The engine structure 12 may include an engine block 14 and a cylinder head casting 16. The engine structure 12 may define first, second and third cylinders 18, 20, 22. The description includes first, second and third cylinders 18, 20, 22 for simplicity and it is understood that the present teachings apply to any number of piston-cylinder arrangements and a variety of reciprocating engine configurations including, but not limited to, V-engines, in-line engines, and horizontally opposed engines, as well as both overhead cam and cam-in-block configurations. The teachings apply to gasoline, diesel or other combustion engine systems. As shown in FIG. 2, the engine structure supports a crankshaft 24 and a plurality of pistons 26 that are disposed in the respective cylinders 18, 20, 22, as is known in the art.

As shown in FIG. 2, the cylinder head casting 16 defines an upper wall 27 of each of the combustion chambers to close off the cylinders 18, 20, 22 and may define at least one intake port 28 and at least one exhaust port 30 associated with each of the cylinders 18, 20 and 22. An intake valve 32 is provided in each intake port 28 and an exhaust valve 34 is provided in each exhaust port 30.

Figure 4:
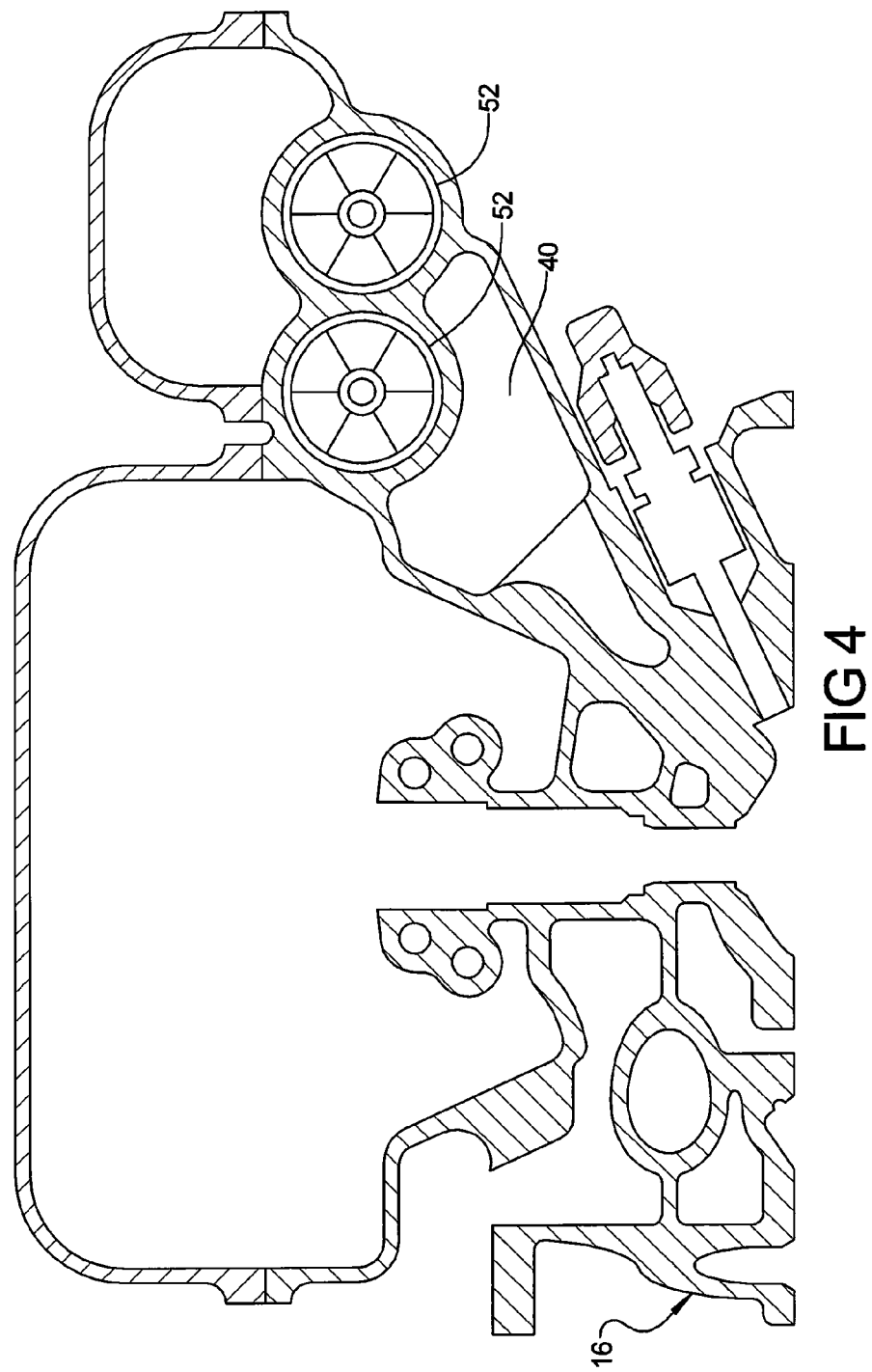
FIG. 4 is a cross-sectional view of the cylinder head casting shown in FIG. 3.

The cylinder head casting 16 defines an intake manifold 40 in communication with each of the intake ports 28. An exhaust manifold 42 (FIG. 1) is in communication with each of the exhaust ports 30. As shown in FIG. 1, a turbocharger 44 includes a turbine 44A that receives exhaust gases from the exhaust manifold 42 and includes an air intake 46 in communication with a compressor 44B that is connected to a charged air passage 48 which is connected to the intake manifold 40. The exhaust gasses from the exhaust manifold 42 pass through the turbine 44A of the turbocharger 44 and are exhausted through passage 50. As shown in FIG. 4, a valve cover 60 and a manifold cover 62 are mounted to the cylinder head casting 16. Although the present disclosure is described with a turbocharger 44, the present disclosure applies to boosted engines using an intake air booster such as a turbocharger or supercharger which require cooling of the intake air.

Figure 3:
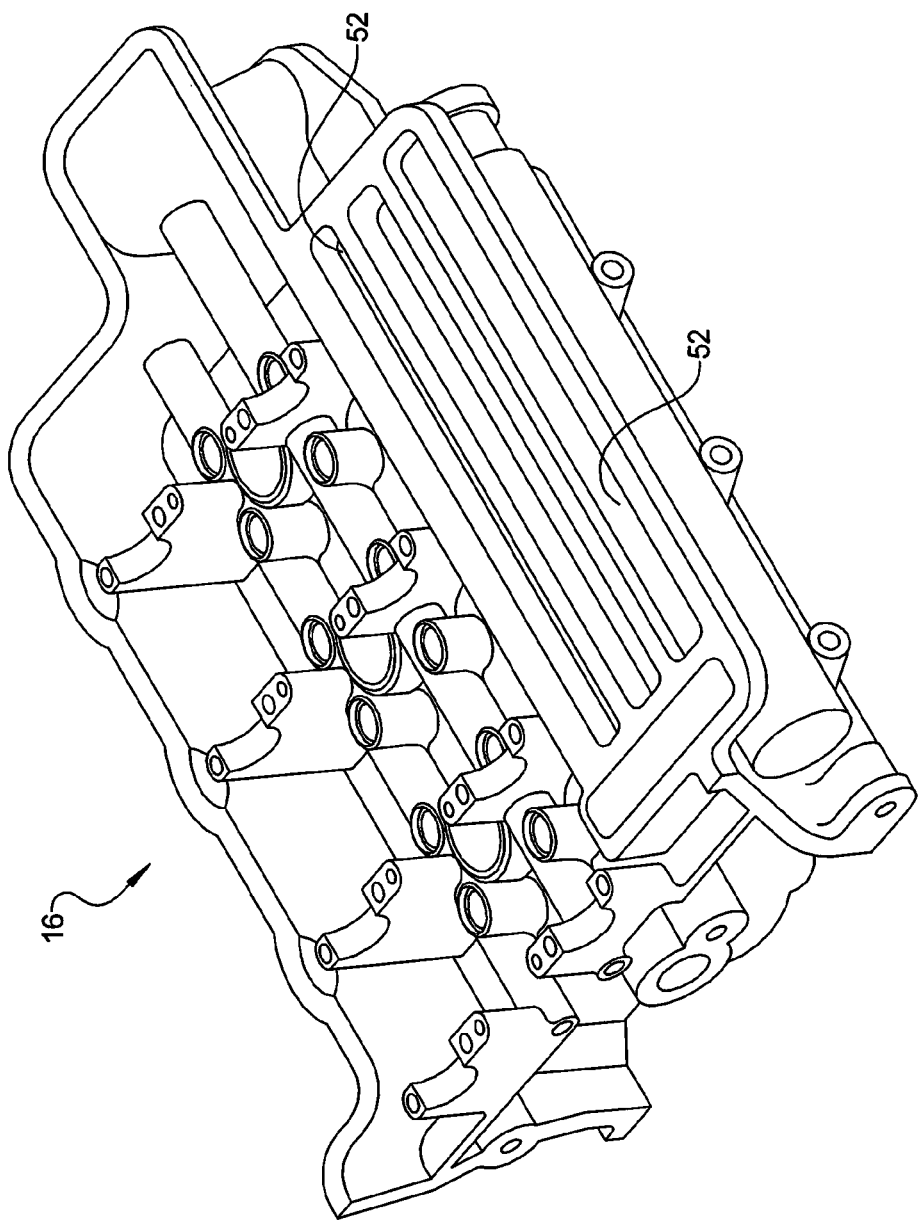
FIG. 3 is a perspective view of a cylinder head casting having a charge air cooler integrated therein according to the principles of the present disclosure.

As shown in FIGS. 2-4, the intake manifold 40 is integrated into the cylinder head casting 16 and includes one or more elongated cooling elements 52 extending laterally across the air passage in communication with the intake manifold 40 upstream of the intake ports 28. The elongated cooling elements 52 can be made from extruded aluminum or other material and can include a plurality of veins 54 separating internal passages. The cooling elements 52 can have a cylindrical outer housing. Cooling fluid such as water can be circulated through the cooling elements 52 by a pump 56 (FIG. 1) in order to cool the intake air as it enters the manifold 40. The extruded aluminum cooling elements 52 are commercially available under the trade name Laminova, and are produced and marketed by SEM AB a Sweden company.

Current designs for water cooled charge air coolers are packaged as separate systems or are built into a separate intake manifold taking up large package volumes and providing for complex intake manifolds. The system of the present disclosure integrates the extruded cooling elements 52 directly into the cylinder head casting 16, thereby providing a very compact design for integration into small vehicles. The compact packaging reduces the intake system volume while also reducing external package size and mass.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine, comprising
an engine block defining a plurality of cylinders; and
a one-piece cylinder head casting mounted to said engine block, said cylinder head casting defining an upper wall of the plurality of cylinders and intake ports and exhaust ports communicating directly with said plurality of cylinders, said cylinder head casting defining an air passage in connection with said intake ports and including cooling elements defining liquid coolant passages disposed in the cylinder head casting within the air passage for cooling intake air passing through the air passage.

2. The internal combustion engine according to claim 1, wherein the cooling elements include an elongated cylindrical housing.

3. The internal combustion engine according to claim 1, wherein the cooling elements extend laterally across said air passage.

4. The internal combustion engine according to claim 1, wherein the cooling elements are received in openings defined in the cylinder head casting on opposite sides of the air passage.

5. The internal combustion engine according to claim 1, wherein the cooling elements have a cross section with fluid passages extending through separate elongated passages.

6. An internal combustion engine, comprising
an engine block defining a plurality of cylinders;
a one-piece cylinder head casting mounted to said engine block, said cylinder head casting defining an upper wall of the plurality of cylinders and intake ports and exhaust ports communicating directly with said plurality of cylinders, said cylinder head casting defining an air passage in connection with said intake ports and including cooling elements defining liquid coolant passages disposed in the cylinder head casting within the air passage for cooling intake air passing through the air passage; and
an intake air booster in communication with the air passage.

7. The internal combustion engine according to claim 6, wherein the cooling elements include an elongated cylindrical housing.

8. The internal combustion engine according to claim 6, wherein the cooling elements extend laterally across said air passage.

9. The internal combustion engine according to claim 6, wherein the cooling elements are received in openings defined in the cylinder head casting on opposite sides of the air passage.

10. The internal combustion engine according to claim 6, wherein the cooling elements have a cross section with fluid passages extending through separate elongated passages.

11. The internal combustion engine according to claim 6, wherein the intake air booster includes a turbocharger.

12. The internal combustion engine according to claim 6, wherein the intake air booster includes a supercharger.

* * * * *